United States Patent [19]

Matsumoto et al.

[11] Patent Number: 4,973,486

[45] Date of Patent: Nov. 27, 1990

[54] FORMULATION OF LACTITOL-CONTAINING FOOD

[75] Inventors: Hiroharu Matsumoto, Ikeda; Fumio Yotsuzuka, Nishinomiya; Takeshi Toyota, Kyoto, all of Japan

[73] Assignee: Takeda Chemical Industries, Inc., Osaka, Japan

[21] Appl. No.: 377,159

[22] Filed: Jul. 10, 1989

Related U.S. Application Data

[63] Continuation of Ser. No. 152,869, Feb. 5, 1988, abandoned.

[30] Foreign Application Priority Data

Feb. 17, 1987 [JP] Japan .................................. 62-35400

[51] Int. Cl.$^5$ ...................... A23L 1/226; A23L 1/236; A23G 1/00; A23F 5/38
[52] U.S. Cl. ..................................... 426/548; 426/531; 426/658; 426/311; 426/595; 426/593; 426/638; 426/650; 426/96; 426/629; 426/631; 426/632; 426/634
[58] Field of Search ............... 426/548, 531, 658, 311, 426/595, 593, 638, 650, 96, 629, 631, 632, 634

[56] References Cited

U.S. PATENT DOCUMENTS

| | | | |
|---|---|---|---|
| 3,928,633 | 12/1975 | Shoaf et al. | 426/548 X |
| 3,956,507 | 5/1976 | Shoaf et al. | 426/548 X |
| 4,537,763 | 8/1985 | Miyake et al. | 426/548 X |
| 4,579,747 | 4/1986 | Sugiyama et al. | 426/548 X |

OTHER PUBLICATIONS

Dialog Data Base, Dialog Acc. No. 2726968, Fale 351:WPI, Abstracting EP 39981, (11-18-81) and others.

*Primary Examiner*—Joseph Golian
*Attorney, Agent, or Firm*—Wenderoth, Lind & Ponack

[57] ABSTRACT

A method for molding lactitol-containing food inclusive of food additives which comprises heating a mixture of a solid food material and lactitol which contains not less than 30% by weight of lactitol, molding the mixture in a semi-molten state and optionally pulverizing the molded product.

12 Claims, No Drawings

FORMULATION OF LACTITOL-CONTAINING FOOD

This application is a continuation of now abandoned application Ser. No. 07/152,869 filed on Feb. 5, 1988.

FIELD OF THE INVENTION

The present invention relates to a method for molding lactitol-containing food. The term "food" used herein includes food additives.

BACKGROUND OF THE INVENTION

As methods for granulation of food additives (sweeteners, flavoring materials, preservatives, dietary supplements, acidulants, etc.) and the like, there have been known extrusion granulation, fluidized granulation, compression molding, mixing-stirring granulation, melt cooling granulation, spray drying granulation and the like. In any granulation method, water and fats and oils are often used in addition to excipients.

Among them, in the case of granulation of food additives and the like, generally, a granulated product is obtained by humidifying a mixture of a food additive and an excipient such as a saccharide or the like with an aqueous solution of a binder such as starch, gelatin or the like and extruding from a die screen to granulate the mixture, or keeping the mixture suspended in air, while spraying an aqueous solution of a binder to granulate the mixture, and then drying the resulting granules with heating.

In these conventional methods, certain food additives are decomposed by heat during the drying step, which results in loss of the food additives. Further, due to vaporization of water, disadvantages in energy and cost are predicted.

Melt cooling granulation method is considered to be a best granulation method for materials which are decomposed in the presence of water or during drying because heat molten properties or press molten properties of excipients are utilized in the method. However, in many cases, melt cooling granulation method employs a hardened oil, a saccharide or the like as an excipient to carry out granulation and there is a problem that a granulated product obtained by using a hardened oil is insoluble in water. And, when granulation is carried out by using a saccharide, a melting temperature should be considerably high depending upon a particular saccharide used. Due to this, the food additives are decomposed, which results in loss of the additives, and further a problem such as coloring of the granulated product obtained is resulted.

OBJECTS OF THE INVENTION

One object of the present invention is to provide an improved molding method inclusive of granulation wherein food materials can be molded without decomposition of their original taste, flavor and the like, and energy loss can be minimized.

Another object of the present invention is to provide an improved molding method, particularly a granulation of food additives, wherein coloring can be avoided, and dustability, flowability, dispersibility and solubility can be improved.

These objects and other objects and advantages of the present invention will become apparent to those skilled in the art from the following description.

SUMMARY OF THE INVENTION

The present invention provides a method for molding a lactitol-containing food which comprises heating a solid food material containing not less than 30% by weight of lactitol, and molding it in a semi-molten state. Optionally, in the method of the present invention, the molded product obtained can be further pulverized to prepare a granulated product.

DETAILED DESCRIPTION OF THE INVENTION

The solid food material to be used in the present invention is any solid food material inclusive of food additives. For example, the solid food material includes beans as fancy food such as dried soybeans, peanuts, coffee beans, cacao beans and the like, flavoring materials such as pepper, ginger and the like, and granular or powdered food additives.

In the case that the food material is in the shape of large mass or grains, usually, it can be pulverized into granules or powder before use.

In the present invention, food additives can be advantageously used as the food material. In this case, so far as the food additive is in the form of powder, its particle size is not specifically limited. However, generally, the particle size is about 3 to 200 $\mu$m. As the food additives, there can be used sweeteners having high sweetness such as aspartame, acesulfame K, stevioside, revaudioside, $\alpha$-glycosyl stevioside, glycyrrhizine, sodium saccharin and the like: bulk sweeteners such as sucrose, lactose, glucose, fructose, maltitol, sorbitol and the like: flavoring materials such as disodium 5'-ribonucleotide (guanylate), disodium 5'-inosinate, sodium 5'-guanylate, monosodium L-glutamate, glycine, alanine and the like: preservatives such as butyl p-hydroxybenzoate, sorbic acid and the like; dietary supplements such as vitamin $B_2$, vitamin C, calcium pantothenate and the like; and acidulants such as citric acid, malic acid and the like. These food additives can be used alone or in combination thereof.

Lactitol (4-$\beta$-D-galactopyranosyl-D-sorbitol) can be used in the form of the anhydride, monohydrate or dihydrate thereof. When the anhydride is used, water equivalent to the dihydrate, i.e., about 10% by weight of water based on the anhydride is added and the mixture is heated. Likewise, when the monohydrate is used, water equivalent to the dihydrate, i.e., about 5% by weight of water based on the monohydrate is added and the mixture is heated.

The lactitol content in a mixture of lactitol and the solid food material is not less than 30% by weight, preferably not less than 50% by weight of lactitol based on the total weight of the mixture. When the lactitol content is less than 30% by weight, it is difficult to obtain a granulated product. By the way, lactitol confectionery (in the shape of plates, flakes, granules) having pleasant sweetness can be obtained by molding about 100% of lactitol.

Heating of a mixture of lactitol and the solid food material can be carried out by using an mixing machine equipped with a heater such as a kneader, a mixer or the like and, thereby, a product in a semi-molten state can be obtained at a temperature of the product of about 60° to 100° C. When the temperature of the product is lower than 60° C., the product remains in the shape of granules or powder without melting. When the temperature is higher than 100° C., the product is completely molten to form a molten candy-like product and, upon cooling, it is solidified to form glass, which is difficult to granulate. Therefore, heating is preferably carried out at about 65° to 85° C.

In the present invention, molding may be carried out by merely cooling the semi-molten mixture to solidify it. That is, the cream-like or semi-molten food material containing lactitol, i.e., the molten product itself obtained by this heating can be used for food as a solid food after cooling. Alternatively, in the present invention, the semi-molten food material can be molded in a suitable shape. The step for this molding itself is not specifically limited and a suitable conventional molding technique can be employed. For example, the resulting cream-like or semi-molten product can be molded in the shape of a plate by using a molder, or in the shape of ribbons, flakes, strings and the like by using a pressure roll (prefarably roll clearance of 0.5 to 5 mm) or an extruder (preferably nozzle size of 0.5 to 7 m/m$\phi$). The resulting cream-like or semi-molten product can be charged in an extruding machine and molded directly.

Optionally, the above molten product can be pulverized after molding. This step can be advantageously applied when the solid food material is a food additive. The pulverization can be carried out by any method in so far as it is generally suitable for application to food. For example, a pulverizer such as a hammer mill type (e.g. an atomizer, a Fitz Mill, a power mill), a pin mill type (e.g. a power mill) or the like can be used. By using these pulverizers, the product is pulverized into a desired particle size, preferably about 150 to 1,500 $\mu$m (100 to 12 mesh), especially about 210 to 1,000 $\mu$m (70 to 16 mesh) to obtain a granulated product.

The product thus obtained by the method of the present invention can be consumed as food or a food additive in the same manner as conventional molded food or granulated food additives according to a particular kind of the solid food material used.

The method for molding lactitol-containing food according to the present invention has been completed from the viewpoint of the low semi-melting and melting points of lactitol (melting point of the dihydrate is about 80° C.) and, particularly, it is characterized in that a molded product can be obtained without deterioration of the original taste, flavor and the like of the food material used and loss of energy is minimized.

Further, by granulating the resulting molded product, particularly, in the case of food additives, coloring of the product can be avoided. Furthermore, in comparison with food additives alone, dustability, flowability, dispersibility and solubility are improved, which contributes to improvement of handling properties.

The following Examples further illustrate the present invention in detail but are not to be construed to limit the scope thereof.

EXAMPLE 1

Aspartame (3 parts by weight) and lactitol dihydrate (97 parts by weight) were mixed in Microspeed Mixer (manufactured by Takara Koki), and the mixture was extruded by using an extruder (39 m/m$\phi$: screw: full flight type: pitch: constant compression ratio: 1:4.7: nozzle: 1 m/m$\phi$) at a temperature of the mixture of 67 to 70° C. for 25 to 30 seconds (residence time) to obtain a molded product in the shape of strings. The resulting molded product was pulverized by using a power mill (manufactured by Showa Kagakukikai Kosakusho, P-02S Model: screen: 2.5 m/m$\phi$) to obtain a white granulated product having a particle size of 16 mesh (1,000 $\mu$m) to 70 mesh (210 $\mu$m) (experimental group). The resulting granulated product and a control product which was a powder mixture of aspartame and lactitol dihydrate were tested for powder properties as well as dispersibility and solubility in water.

As powder properties, dustability and static electrification were compared using simple and convenient methods. Dustability was tested by charging a sample (200 g) in a flow coater (manufactured by Freund Sangyo K.K., FL-10 Model) and observing dusting of the sample when air was blown from the bottom. Static electrification was tested by charging a sample (10 g) in a polyethylene bag of 11×16 cm and examining adhesion of the sample onto the inner surface of the bag after shaking slightly.

Regarding solubility and dispersibility, water (100 ml) was placed in a 100 ml beaker, and a sample (2 g) was added thereto with stirring by a magnetic stirrer, and measuring the time required for dissolution. Dispersibility was evaluated by observing wetting and dispersion with water by the naked eye. The results are shown in Table 1.

TABLE 1

| | Experimental group | Control group |
|---|---|---|
| Powder properties | | |
| Dustability | Slightly observed | High |
| Static electrification | Slightly observed | Intensive |
| Solubility and dispersibility | | |
| Time required for dissolution (25° C.) | 50–55 sec. | 180–200 sec. |
| Dispersibility | Quickly dispersed without any undissolved lumps | Slowly dispersed with forming undissolved lumps |
| Remaining rate of Aspartame | 100% | 100% |
| Sweetness (compared with sugar) | 5-fold | 5-fold |

As seen from the above results, in the granulated product of the experimental group, dustability, static electrification, solubility and dispersibility have been improved without decomposition of aspartame.

EXAMPLE 2

While sodium saccharin (25 parts by weight) and lactitol monohydrate (75 parts by weight) were mixed in a kneader (manufactured by Fuji Paudal, KDHJ-2 Model), water (3.75 parts by weight) was added, and the mixture was molten with heating at 80° C. Then, the molten product was removed from the kneader and cooled. The cooled molded product was pulverized by a coffee mill (manufactured by Hitachi Seisakusho, CM-601 Model) to obtain a white granulated product having a particle size of 24 mesh to 70 mesh (experimental group) The resulting granulated product and a control product which is a powder mixture of sodium saccharin and lactitol monohydrate were tested for powder properties as well as dispersibility and solubility with water in the same manner as in Example 1. The results are shown in Table 2.

As seen from Table 2, in the granulated product of the experimental group, dustability, static electrification, solubility and dispersibility have been improved.

TABLE 2

| Powder properties | Experimental group | Control group |
| --- | --- | --- |
| Dustability | Slightly observed | Very high |
| Static electrification | Slightly observed | Very intensive |
| Solubility and dispersibility | | |
| Time required for dissolution (25° C.) | 15–20 sec. | 60–70 sec. |
| Dispersibility | Quickly dispersed without un-dissolved lumps | Formation of some undissolved lumps |
| Sweetness (compared with sugar) | 50-fold | 50-fold |

EXAMPLE 3

While α-glycosyl stevioside (6 parts by weight) and lactitol anhydride (94 parts by weight) were mixed in Microspeed Mixer (manufactured by Takara Koki), water (9.4 parts by weight) was added. The resulting mixture was extruded by using an extruder (nozzle: 4 m/mφ; other conditions were same as in Example 1) at a temperature of the mixture of 70° to 75° C. for 25 to 30 seconds (residence time) to obtain a molded product in the shape of pellets. The resulting molded product was pulverized by a Fitz Mill (manufactured by Hosokawa Iron Works, H-10308 Model; screen: 1 m/mφ) to obtain a white granulated product having a particle size of 24 mesh to 70 mesh (experimental group) The resulting granulated product and a control product which is a powder mixture of α-glycosyl stevioside and lactitol anhydride were tested for powder properties as well as dispersibility and solubility with water in the same manner as in Example 1. The results are shown in Table 3.

As seen from Table 3, in the granulated product of the experimental group, dustability, static electrification, solubility and dispersibility have been improved.

TABLE 3

| Powder properties | Experimental group | Control group |
| --- | --- | --- |
| Dustability | Slightly observed | High |
| Static electrification | Slightly observed | Intensive |
| Solubility and dispersibility | | |
| Time required for dissolution (25° C.) | 20–25 sec. | 70–80 sec. |
| Dispersibility | Quickly dispersed without un-dissolved lumps | Formation of some undissolved lumps |
| Sweetness (compared with sugar) | 5-fold | 5-fold |

EXAMPLE 4

Aspartame (0.3 part by weight), lactitol dihydrate (50 parts by weight) and powdered maltitol (49.3 parts by weight) were mixed in Microspeed Mixer (manufactured by Takara Koki), and the resulting mixture was extruded by using an extruder (39 m/mφ; screw: full flight type: pitch: constant: compression ratio: 1:4.7: nozzle: 5 mm×25 mm) at a temperature of the mixture of 70° to 75° C. for 25 to 30 seconds (residence time), then immediately rolled by a noodle ribbon producing machine (roll clearance: 1 mm) to obtain a molded product in the shape of ribbons. The resulting molded product was pulverized by using a power mill (manufactured by Showa Kagakukikai Kosakusho, P-02S Model: screen: 2.0 m/mφ) to obtain a white granulated product having a particle size of 20 mesh to 70 mesh (experimental group). The resulting granulated product and a control product which was a powder mixture of aspartame, lactitol dihydrate and powdered maltitol were tested for powder properties as well as dispersibility and solubility in water. The results are shown in Table 4.

As seen from Table 4, in the granulated product of the experimental group, aspartame has been remained without decomposition and dustability, static electrification, solubility and dispersibility have been improved.

TABLE 4

| Powder properties | Experimental group | Control group |
| --- | --- | --- |
| Dustability | Slightly observed | High |
| Static electrification | Slightly observed | Intensive |
| Solubility and dispersibility | | |
| Time required for dissolution (25° C.) | 10–15 sec. | 60–70 sec. |
| Dispersibility | Quickly dispersed without un-dissolved lumps | Producing some undissolved lumps |
| Remaining rate of aspartame | 100% | 100% |
| Sweetness (compared with sugar) | 1-fold | 1-fold |

EXAMPLE 5

Disodium 5'-ribonucleotide (guanylate) (2.5 parts by weight), monosodium L-glutamate (47.5 parts by weight) and lactitol dihydrate (50 parts by weight) were mixed in a kneader (manufactured by Fuji Paudal, KDHJ-2 Model) and then molten with heating at a temperature of the mixture of 80° C. Then, the molten product was removed from the kneader and cooled. The cold molded product was pulverized by a coffee mill (manufactured by Hitachi Seisakusho, CM-601 Model) to obtain a granulated product having a particle size of 20 mesh to 70 mesh. The resulting product was white granules having less dustability and static electrification as well as good dispersibility in water, and it quickly dissolved in water.

EXAMPLE 6

Sorbic acid (20 parts by weight) and lactitol dihydrate (80 parts by weight) were mixed in Microspeed Mixer (manufactured by Takara Koki), and the mixture was extruded by using an extruder (39 m/mφ; screw: full flight type: pitch: constant; compression ratio: 1:4.7: nozzle: 1 m/mφ) at a temperature of the mixture of 68° to 72° C. for 25 to 30 seconds (residence time) to obtain a product in the form of strings. The molded product was pulverized by a power mill (manufactured by Showa Kagakukikai Kosakusho, P-02S Model: screen: 1.5 m/mφ) to obtain a granulated product having a particle size of 20 mesh to 70 mesh. The resulting product was white granules having less dustability and static electrification as well as excellent dispersibility and solubility in water.

EXAMPLE 7

L-Ascorbic acid (10 parts by weight), sodium L-ascorbate (1.8 parts by weight), DL-malic acid (5 parts by weight), lemon flavor powder (1 part by weight), sodium riboflavin phosphoric acid ester (0.01 part by weight), aspartame (0.25 parts by weight) and lactitol dihydrate (81.94 parts by weight) were mixed in Microspeed Mixer (manufactured by Takara Koki), and the resulting mixture was placed in a kneader (manufactured by Fuji Paudal, KDHJ-2 Model) and molten with heating at a temperature of the mixture of 78° C., and immediately rolled using a noodle ribbon producing machine (roll clearance: 1 mm) to obtain a molded product in the shape of ribbons. The molded product was pulverized by Power Mill (manufactured by Showa Kagaku Kikai Kosakusho, P-02S Model: screen: 2.0 m/m$\phi$) to obtain a granulated product having a particle size of 20 mesh to 70 mesh. The resulting granulated product was in pale yellow and had less dustability and static electrification. It a nutrient supplementary food with low calorie which quickly dissolved in the mouth and had pleasant taste.

EXAMPLE 8

Coffee powder (50 parts by weight), aspartame (0.75 part by weight), lactitol dihydrate (49.25 parts by weight) were mixed in Microspeed Mixer (manufactured by Takara Koki). The resulting mixture was extruded by using an extruder (under the same conditions as in Example 1) at a temperature of the mixture of 70° to 75° C. for 25 to 30 seconds (residence time), then immediately cooled and solidified to obtain a molded product in the shape of strings.

The molded product was granulated by a power mill (manufactured by Showa Kagakukikai Kosakusho, P-02S Model: screen: 2.5 m/m$\phi$) to obtain a granulated product having a particle size of not more than 16 mesh (1,000 $\mu$m).

By simply pouring hot water onto two-spoonful of the resulting product (ca. 4 g) per one cap, coffee with well-balanced coffee aroma and sweetness can be obtained.

EXAMPLE 9

Ginger juice (1.8 parts by weight) and water (3.2 parts by weight) were added to lactitol hydrate (100 parts by weight), and molten in a kneader (manufactured by Fuji Paudal, KDHJ-2 Model) with heating at a temperature of the mixture of 85° C. Then, the mixture was cast in a molder of 5 mm in thickness and immediately cooled to solidify it to obtain a molded product in the shape of a plate of 5 mm in thickness.

The resulting molded product is a ginger candy with low calorie which has good ginger flavor and low sweetness.

EXAMPLE 10

Acesulfame K (4.1 parts by weight) and lactitol dihydrate (95.9 parts by weight) were mixed in Microspeed Mixer (manufactured by Takara Koki K.K., MS-5 Model) and heated with a single screw extruder (manufactured by Brabender Co.; screw: 16 m/m$\phi$, full flight type: pitch: constant: compression rate: 1:4.5; clearance (exit): 0.7 m/m) at the temperature of 70° C. for 15 seconds (residence time) to obtain white continuous cylindrical product. After cooling to room temperature, the molded product was pulverized with a power mill (the same screen as that of Example 6, 24 mesh) to obtain a fine granular product. The granulated product had excellent fluidity and, in comparison with sugar, its sweetness was 5-fold and calorie was 1/10.

We claim:

1. A method of producing a granulated food product which comprises heating a solid food additive selected from the group consisting of artificial sweeteners, bulk natural sweeteners, flavoring material other than sweeteners, preservatives, dietary supplements and acidulants in combination with not less than 50% by weight of lactitol in the form of dihydrate at about 60° to 100° C., molding it in a semi-molten state and pulverizing the resulting molded product.

2. A method according to claim 1, wherein the food additive is an artificial sweetener selected from the group consisting of aspartame, acesulfame K, stevioside, revaudioside, $\alpha$-glycosyl stevioside, glycyrrhizine, sodium saccharin, and mixtures thereof.

3. A method according to claim 1, wherein the solid food material is beans selected from the group consisting of dried soybeans, peanuts, coffee beans and cacao beans.

4. A method according to claim 1, wherein the solid food material is a flavoring material selected form the group consisting of pepper and ginger.

5. A method according to claim 1, wherein the molding is conducted by use of a member selected from the group consisting of a pressure roll or an extruder.

6. A method according to claim 1, wherein the bulk sweetener is a member selected from the group consisting of sucrose, lactose, glucose, fructose, maltitol, sorbitol and mixtures thereof.

7. A method according to claim 6, wherein the method further comprises pulverizing the resulting molded product.

8. A method according to claim 1, wherein the flavoring material is a member selected from the group consisting of disodium 5'-ribonucleotide (guanylate), disodium 5'-inosinate, sodium 5'-guanylate, monosodium L-glutamate, glycine, alanine and mixtures thereof.

9. A method according to claim 1, wherein the preservative is a member selected from the group consisting of butyl p-hydroxybenzoate, sorbic acid and mixtures thereof.

10. A method according to claim 1, wherein the dietary supplement is a member selected from the group consisting of vitamin $B_2$, vitamin C, calcium pantothenate and mixtures thereof.

11. A method according to claim 1, wherein the acidulant is a member selected from the group consisting of citric acid, malic acid and mixtures thereof.

12. A method according to claim 1 in which the heating of the solid food additive is carried out at about 65° to 85° C.

* * * * *

UNITED STATES PATENT AND TRADEMARK OFFICE
CERTIFICATE OF CORRECTION

PATENT NO. : 4,973,486

DATED : November 27, 1990

INVENTOR(S) : Hiroharu MATSUMOTO; Fumio YOTSUZUKA and Takeshi TOYOTA

It is certified that error appears in the above-identified patent and that said Letters Patent is hereby corrected as shown below:

On the cover sheet of the patent, Item [75], delete in its entirety and insert the following:

-- [75] Inventors: Hiroharu Matsumoto, Ikeda, Japan; Fumio Yotsuzuka, Eastchester, New York, U.S.A.; Takeshi Toyota, Kyoto, Japan --

Signed and Sealed this

Twenty-ninth Day of September, 1992

*Attest:*

DOUGLAS B. COMER

*Attesting Officer*     *Acting Commissioner of Patents and Trademarks*